(12) United States Patent
Zamyatin et al.

(10) Patent No.: US 8,294,717 B2
(45) Date of Patent: Oct. 23, 2012

(54) ADVANCED CLUSTERING METHOD FOR MATERIAL SEPARATION IN DUAL ENERGY CT

(75) Inventors: Alexander Zamyatin, Hawthorn Woods, IL (US); Anusha Muthu Natarajan, Buffalo Grove, IL (US); Yu Zou, Naperville, IL (US)

(73) Assignees: Kabushiki Kaisha Toshiba, Tokyo (JP); Toshiba Medical Systems Corporation, Tochigi-Ken (JP)

( * ) Notice: Subject to any disclaimer, the term of this patent is extended or adjusted under 35 U.S.C. 154(b) by 776 days.

(21) Appl. No.: 12/492,754

(22) Filed: Jun. 26, 2009

(65) Prior Publication Data

US 2010/0328313 A1 Dec. 30, 2010

(51) Int. Cl.
*G06T 11/20* (2006.01)
(52) U.S. Cl. ........................................ 345/440
(58) Field of Classification Search .................. 345/440
See application file for complete search history.

(56) References Cited

U.S. PATENT DOCUMENTS 8,115,784 B2 * 2/2012 Licato et al. ................ 345/634
2007/0092127 A1 4/2007 Grasruck et al.

OTHER PUBLICATIONS

Zou, Yu, and Silver, Michael D., "Analysis of Fast kV-switching in Dual Energy CT using a Pre-reconstruction Decomposition Technique", Medical Imaging 2008: Physics of Medical Imaging. Edited by Hsieh, Jiang; Samei, Ehsan. Proceedings of the SPIE, vol. 6913, pp. 691313-691313-12 (2008).

* cited by examiner

*Primary Examiner* — Ryan R Yang
(74) *Attorney, Agent, or Firm* — Knoble Yoshida & Dunleavy, LLC

(57) ABSTRACT

Three or more materials are advantageously separated from dual energy data by using a material separation technique. To effectively separate material clusters, a density plot is introduced to automatically render cluster separations. Initially, the projection data optionally undergo data-domain dual energy decomposition. Then, the image data is plotted in a vector plot whose axes are the low HU values and the high HU values. For a given data point in the vector plot, a number of data points is counted within in a region of interest surrounding the given data point to generate a density plot where each point now represents a density level surrounding the data point. Thus, clustering of a certain material is visualized by a predetermined color assignment scheme. Furthermore, special image processing methods such as Gaussian decomposition are used to improve the accuracy of material separation. In addition, the HSL color model may be used for better visualization and to bring a new dimension in material separation display.

38 Claims, 15 Drawing Sheets

FIG. 1
PRIOR ART
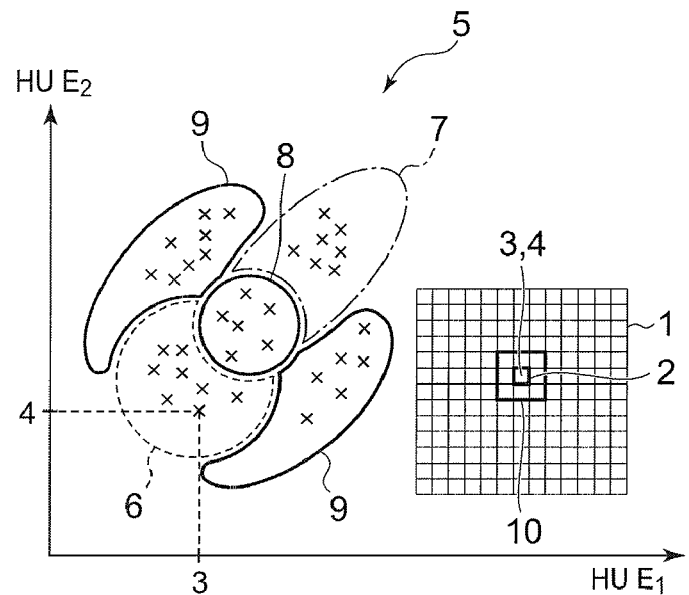
FIG. 2A
PRIOR ART
FIG. 2B
PRIOR ART
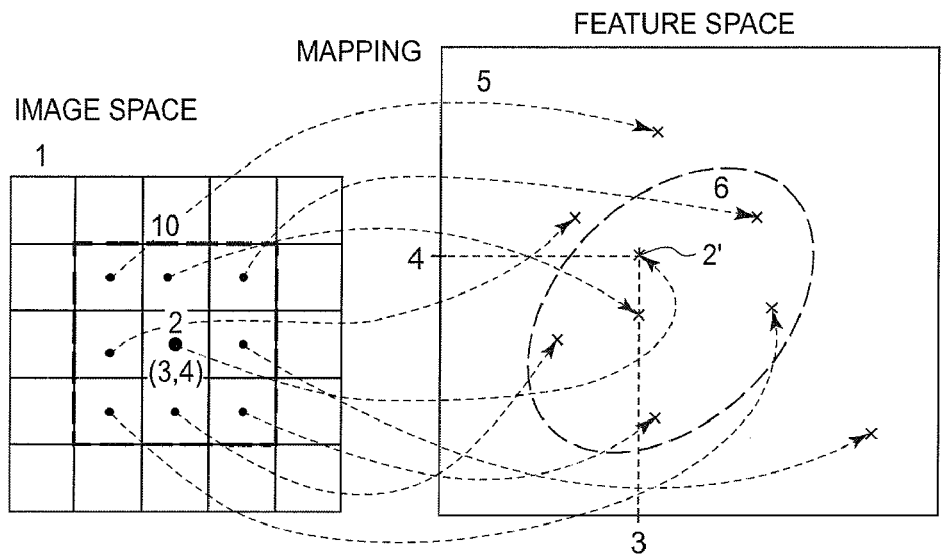

FIG. 15
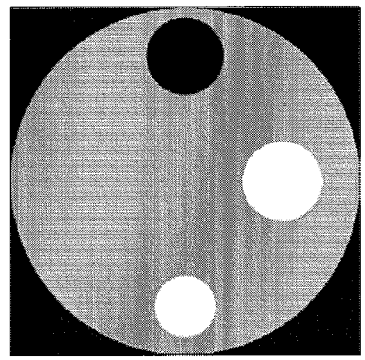
FIG. 16A  FIG. 16B  FIG. 16C
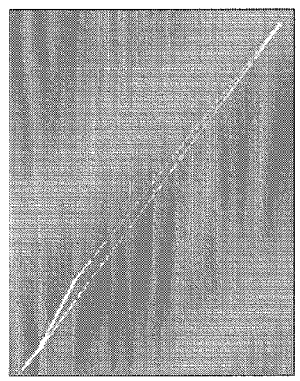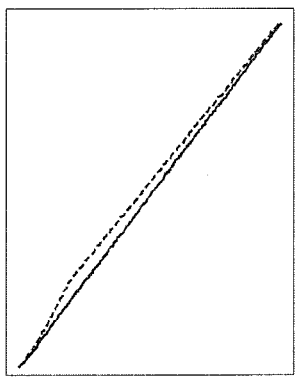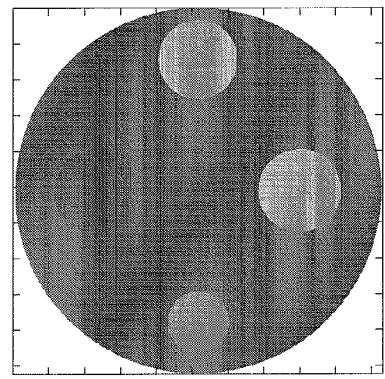
FIG. 17
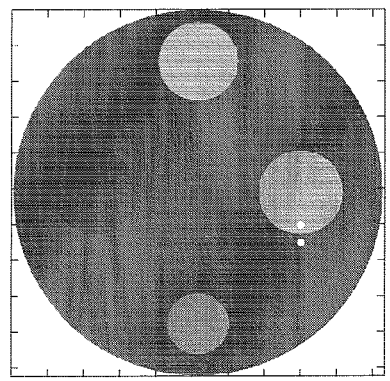

ADVANCED CLUSTERING METHOD FOR MATERIAL SEPARATION IN DUAL ENERGY CT

FIELD OF THE INVENTION

The embodiments of the current invention are generally related to material separation techniques in dual energy computed tomography (CT) and more particularly related to a particular type of density plotting for improved cluster separation.

BACKGROUND OF THE INVENTION

The dual energy x-ray CT scan data are acquired at two energy levels. For example, the tube is set at the low and high energy levels of 80 kV and 120 kV. To use the dual energy data for material separation, the projection data undergo preconstruction decomposition. Alvarez and Macovski (1976) developed a mathematical scheme, called dual-energy decomposition, to use the dual energy information.

The physical basis of dual energy imaging includes two main mechanisms of the interaction of X rays with matter in the clinically relevant diagnostic energy-range from 30 keV to 140 keV, and the two interactions are photoelectric absorption and Compton scattering, each having its own functional dependence on X-ray energy. Photoelectric absorption is a rapidly decreasing function of energy while Compton scatter is a gentle function of energy. The photoelectric interaction is a strong function of the effective atomic number (Z) of the absorbing tissue while scattering is nearly independent of Z.

In addition to the energy dependence, dual-energy decomposition must take X-ray sources into account. Since commercial clinical CT-scanners generally use polychromatic sources, the mathematics of dual energy imaging is not trivial. In this regard, single-energy imaging with a polychromatic source does not have an exact and analytic solution. One mathematical approach in dual-energy decomposition using a polychromatic source has been described in a related U.S. application Ser. No. 12/361,280 filed on Jan. 28, 2009 and Ser. No. 12/106,907 filed on Apr. 21, 2008 as well as in a reference entitled as "Analysis of Fast kV-switching in Dual Energy CT using a Pre-reconstruction Decomposition Technique," by Yu Zou and Michael D. Silver (2008). In dual energy computed tomography (CT), fast kV-switching techniques generally alternate voltages between projections (also called views) so that the odd (or even) projections correspond to the low (or high) tube voltage. These references are incorporated into the current application by external reference to supplement the specification. Instead of the polynomial approximation method, in the previously proposed approach combining a linear term with a non-linear beam hardening term, an iterative solution to the dual energy data domain decomposition converges rapidly due to the dominant linear term.

In the past two years, prior art attempts have implemented certain dual energy CT systems. For example, Siemens has installed a number of dual source CT-scanners, which is equipped with two X-ray sources, and each runs at a different energy level for generating the two data sets. Another example is that Philips at their Haifa research facility has developed a sandwich detector where the upper layer records the low energy data while the lower layer records the high energy data. A prototype system is installed at the Hadassah Jerusalem Hospital. In this regard, GE has developed a specialized detector using garnet for capture 2496 total projections per rotation (TPPR) at a high speed. The fast detector has been combined with a fast kV-switching X-ray source to acquire the low and high energy data sets.

Regardless of the above described dual energy data acquisition techniques, polychromatic images are reconstructed at each energy in the preconstruction decomposition approach, and each material is characterized by its "dual energy index" as described by N. J. Pelc in "Dual Energy: technical curiosity or potential clinical tool, RSNA 2007." In further detail, the dual energy index I is expressed in the following formula.

$$I = \frac{HU_{LOW} - HU_{HIGH}}{HU_{LOW} + HU_{HIGH} + 2000}$$

where HU stands for Hunsfield Unit that is a unit of absorption and is determined by a detector.

Referring to FIG. 1, U.S. Patent Publication 2007/0092127 discloses that the two HU values (HU E1, E2) in the image space are plotted as a single data point in a feature space. For example, two attenuation values 3, 4 are detected in response to the two different energies E1, E2 of the X radiation at a detector unit, and these HU values are assigned to a corresponding pixel 2 in the X-ray image or image space 1. By the same token, pixels surrounding the pixel 2 in a predetermined area 10 each have a pair of the HU values. The HU data of these pixels are mapped into the feature space 5 according to the disclosure of U.S. Patent Publication 2007/0092127. According to the original drawing, although both X and Y axes of the feature space 5 are labeled as "HU $E_1$," it is assumed that one of the axes should be labeled as "HU $E_2$" as shown in FIG. 1. Since the above example does not disclose any more details, the inventor of the current application assumes the mapping technique of U.S. Patent Publication 2007/0092127 to be performed in the following manner as illustrated in FIGS. 2A and 2B, which are not in the prior art publication.

The X and Y axes of the image space as illustrated in FIG. 2A respectively correspond to the location of pixels or detector units, and each square represents a pixel having a pair of the low and high HU values. The X and Y axes of the feature space as illustrated in FIG. 2B respectively correspond to the HU values of the low and high HU values. In this prior art example, nine pixels in a local area 10 in the image space 1 of FIG. 2A are mapped into the corresponding nine data points in the feature space 5 of FIG. 2B as indicated by the respective arrows. For example, the pixel 2 in the image space 1 has a pair of the HU values (3, 4) and is represented in the data point 2' in the feature space 5.

Patent Publication 2007/0092127 further discloses other steps of the prior art technique to separate a certain material based upon the above described image space and feature space. To determine whether or not a give pixel 2 belongs to a particular material, the feature space in FIG. 2B has a known pre-defined region boundary 6 for the particular material. According to the prior art technique, a pixel in the local area 10 is counted if they are mapped inside the known region 6. In this example as illustrated in FIGS. 2A and 2B, among the nine pixels in the local area 10, six pixels are mapped inside the region boundary 6. Thus, the prior art technique specifically counts a number of pixels in the image domain if those pixels belong to the local area 10 surrounding the pixel 2 and are mapped inside the region 6 of the feature space 5.

According to Patent Publication 2007/0092127, the number of the pixels inside the know region is a value of an access variable, and the value is further compared to a predetermined threshold value to ultimately determine whether or not the pixel 2 belongs to the know material. In this regard, assuming the threshold value of four, since the exemplary value of six is counted for the access variable and is above the threshold value, the pixel 2 belongs to the know material. On the other hand, if the access variable value is below the threshold value, it can be further determined based a probability function whether or not the pixel belongs to a certain group of pixels. These other groups represent another material, either of the two materials and neither of the two materials. The prior art technique repeats the above described process for each pixel in the image space in order to separate a known material.

The above described prior art technique requires at least three limitations. First, the known regions in the feature space must be established in advance for each material to be separated. Secondly, the number of predetermined areas quickly becomes large. As illustrated in FIG. 1 of the prior art technique, for two know materials, a combination of six regions must be established in advance. Thirdly, even if the region boundary is established for a particular material, the region boundary may not be applicable to a given dual energy data set unless the data set is acquired under the same conditions for the established region. These conditions include an X ray source, a dosage level, a material thickness and so on. For these and other reasons, the above described prior art technique remain desired.

SUMMARY OF THE INVENTION

In order to solve the above and other problems, according to a first aspect of the current invention, a method of material separation in dual energy computed tomography (CT), includes the steps of: a) acquiring dual energy data as image data as a subject portion is being scanned; b) plotting image data points in a vector plot based upon the dual energy data, the vector plot having HU values in both axes; c) defining in the vector plot a region of interest according to a common rule for a given one of the image data points; d) counting a number of the image data points inside the region of interest in the vector plot to define a density value for the given one of the image points; e) repeating said steps c) and d) for each of the image data points in the vector plot; and f) plotting a density plot based upon the density values, the density plot having HU values in both axes.

According to a second aspect of the current invention, a method of material separation in dual energy computed tomography (CT), includes: a) acquiring dual energy data for image data as a subject portion is being scanned; b) performing data-domain decomposition on the dual energy data to generate two basis images having two basis image values; c) plotting image data points in a vector plot based upon the two basis image values; d) defining in the vector plot a region of interest according to a common rule for a given one of the image data points; e) counting a number of the image data points inside the region of interest in the vector plot to define a density value for the given one of the image data points; f) repeating said steps d) and e) for each of the image data points in the vector plot; g) displaying a density plot indicating the density values for each of the image data points; and h) separating clusters in the density map to generate separated clusters based upon the density values.

According to a third aspect of the current invention, a dual energy computed tomography (CT) system configured to perform material separation of dual energy data, includes: a dual energy data acquisition device for acquiring dual energy data for image data as a subject portion is being scanned; and a reconstruction device connected to said dual energy data acquisition device for processing image data points in a vector plot based upon the dual energy data, the vector plot having HU values in both axes, said reconstruction device defining in the vector plot a region of interest according to a common rule for each of the image data points, wherein said reconstruction device counts a number of the image data points inside the region of interest in the vector plot to define a density value for each of the image data points in the vector plot, and said reconstruction device processes a density plot based upon the density values, the density plot having HU values in both axes.

According to a fourth aspect of the current invention, a dual energy computed tomography (CT) system configured to perform material separation on dual energy data, includes: a dual energy data acquisition device for acquiring dual energy data as a subject portion is being scanned; and a material separation unit connected to said dual energy data acquisition for performing data-domain decomposition on the dual energy data to generate two basis images having two basis image values, said material separation unit processing image data points in a vector plot based upon the two basis image values, said material separation unit also defining in the vector plot a region of interest according to a common rule for each of the image data points, wherein said material separation unit counting a number of the image data points inside the region of interest in the vector plot to define a density value for each of the image data points in the vector plot, said material separation unit processes a density plot based upon the density values, the material separation unit separates clusters in the density map to generate separated clusters based upon the density values.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a diagram that is reproduced from FIG. 3 in the prior art publication US 2007/0092127.

FIGS. 2A and 2B are diagrams illustrating one prior art technique for separating a material according the image data.

FIG. 10A illustrates a phantom definition including fat, blood, bone, water and iodine contrast agent (ICA) for the simulation data.

FIG. 10B illustrates a monochromatic image at 40 keV while FIG. 10C illustrates a monochromatic image at 100 keV.

FIG. 11A illustrates a phantom definition including fat, blood, bone, water, calcium and iodine contrast agent (ICA) for the simulation data.

FIG. 11B illustrates a monochromatic image at 70 keV while FIG. 11C illustrates a monochromatic image at 100 keV.

FIG. 15 illustrates a monochromatic image at 40 keV for the simulated data as shown in FIG. 10.

FIG. 16A illustrates results in a density plot for the simulated data as shown in FIG. 10.

FIG. 16B illustrates a color assignment, which is applied to the density plot of FIG. 16A.

FIG. 16C illustrates a material separation map that is generated from applying the color assignment of FIG. 16B to the density plot of FIG. 16A.

FIG. 17 illustrates a material separation map for the simulated data as shown in FIG. 11.

DETAILED DESCRIPTION OF EMBODIMENT(S)

Figure 3:
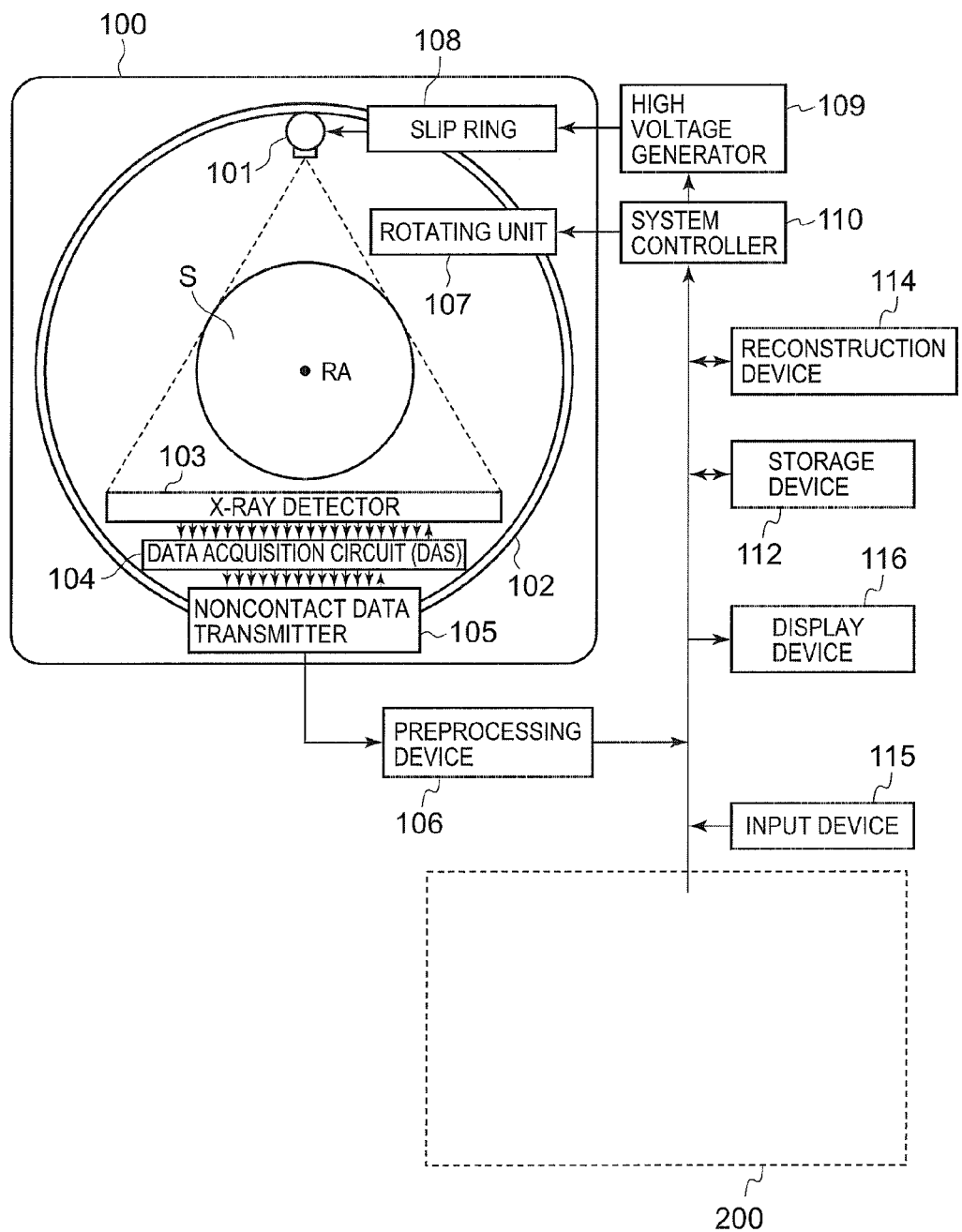
FIG. 3 is a diagram illustrating one embodiment of the CT apparatus according to the current invention.

Referring now to the drawings, wherein like reference numerals designate corresponding structures throughout the views, and referring in particular to FIG. 3, a diagram illustrates one embodiment of the multi-slice dual energy X-ray CT apparatus or scanner according to the current invention including a gantry 100 and other devices or units. The gantry 100 is illustrated from a side view and further includes an X-ray tube 101 and a multi-row or two-dimensional array type X-ray detector 103. The X-ray tube 101 and X-ray detector 103 are diametrically mounted across a subject S on an annular frame 102, which is rotatably supported around a rotation axis RA. A rotating unit 107 rotates the frame 102 at a high speed such as 0.4 sec/rotation while the subject S is being moved along the axis RA.

The multi-slice dual energy X-ray CT apparatus further includes a high voltage generator 109 that applies a tube voltage to the X-ray tube 101 through a slip ring 108 so that the X-ray tube 101 generates X ray. In one embodiment of the multi-slice X-ray CT apparatus according to the current invention, the voltage value at the X-ray tube 101 is set at either a predetermined high energy level or a predetermined low energy level to generate dual energy X ray. The X rays are emitted towards a subject whose cross sectional area is represented by a circle. The X-ray detector 103 is located at an opposite side from the X-ray tube 101 across the subject for detecting the emitted X rays that have transmitted through the subject.

Still referring to FIG. 3, the X-ray CT apparatus or scanner further includes other devices for processing the detected signals from X-ray detector 103. A data acquisition circuit or a Data Acquisition System (DAS) 104 converts a signal output from the X-ray detector 103 for each channel into a voltage signal, amplifies it, and further converts it into a digital signal. The X-ray detector 103 and the DAS 104 are configured to handle a predetermined total number of projections per rotation (TPPR) that can be at the most 900 TPPR, between 900 TPPR and 1800 TPPR and between 900 TPPR and 3600 TPPR.

In other embodiments of the CT apparatus or scanners according to the current invention, the dual energy function is implemented as various dual energy data acquisition devices. For example, one embodiment utilizes a fast kV-switching technique that changes voltages between projections (also called views) so that the odd or even projections respectively correspond to the low or high tube voltage. The prior art fast kV-switching techniques have very good temporal and spatial registrations between corresponding high and low energy projections, which make data domain methods possible and lead to better image quality and flexibility even with helical projections. Certain prior art preconstruction decomposition techniques have addressed disadvantages including a high noise level in the low energy data and inherent one-view misregistration between corresponding high and low energy projections.

Another exemplary embodiment of the dual energy data acquisition device utilizes a slow kV-switching technique. For example, for a circular scan, the tube voltage is at high energy for all views during the first rotation. Then, the tube voltage is switched to low energy before or during the next rotation and maintained for all views during the second rotation. In this regard, slow kV-switching is about a factor of 1000 to 2000 slower than fast kV-switching. Although the slow kV-switching technique does not require additional parts or equipment, dual energy data sets result in poor temporal registration that is off by at least one rotation period as well as poor spatial registration particularly from helical scans.

In three other embodiments, the dual energy implementation requires additional hardware devices or components. In one embodiment according to the current invention, the CT apparatus includes dual X-ray sources for simultaneously generating two spectra of X rays. In another embodiment according to the current invention, the CT apparatus includes a specialized sandwich detector or dual layer detector. Both the dual source CT scanners and the sandwich detector CT scanners must resolve some technical difficulties that are associated with these systems. Lastly, in the last one of the three other embodiments according to the current invention, the CT apparatus further includes a photon counting detector for counting the photons according to the predetermined separate energy bins. In these three other embodiments including the dual sources, the sandwich detector and the photon counting detector, since additional costs incur, these embodiments may be less cost-effective to obtain dual energy data sets.

As described above, the dual energy data acquisition function of the multi-slice dual energy X-ray CT apparatus or scanner may be implemented in various embodiments according to the current invention. In this regard, the advanced material separation technique of the current invention is not limited to a particular dual-energy data acquisition technique or implementation and is applicable to the dual energy data that is obtained by any generally known prior art dual energy data acquisition technique or implementation.

Regardless of the data acquisition implementations, the above projection raw data is sent to a preprocessing device 106, which is housed in a console outside the gantry 100 through a non-contact data transmitter 105. The preprocessing device 106 performs certain corrections such as sensitivity correction on the raw data. A storage device 112 then stores the resultant data that is also called projection data at a stage immediately before reconstruction processing. The storage device 112 is connected to a system controller 110 through a data/control bus, together with a reconstruction device 114, display device 116, input device 115, and the scan plan support apparatus 200. The scan plan support apparatus 200 includes a function for supporting an imaging technician to develop a scan plan.

The reconstruction device 114 further includes various software and hardware components. According to one aspect of the current invention, the reconstruction device 114 of the dual energy CT apparatus advantageously separates two or more materials using dual energy data according to a material separation technique based upon density. For the material separation, the projection data optionally undergo data-domain dual energy decomposition before reconstruction. During the reconstruction, density plots are introduced to allow automatic cluster separation without any prior preparation or data of a known material. A density plot is generated from image data points in a vector plot.

Alternatively, in another embodiment of the current invention, a separation unit of the dual energy CT apparatus advantageously separates two or more materials using dual energy data according to a material separation technique based upon density. Although the separation unit is not illustrated in FIG. 3, the separation unit is dedicated to perform the tasks associated with the advanced material separation according to the current invention. This and other embodiments are optionally included in the current scope of the invention as more particularly claimed in the appended claims.

Figure 4A:
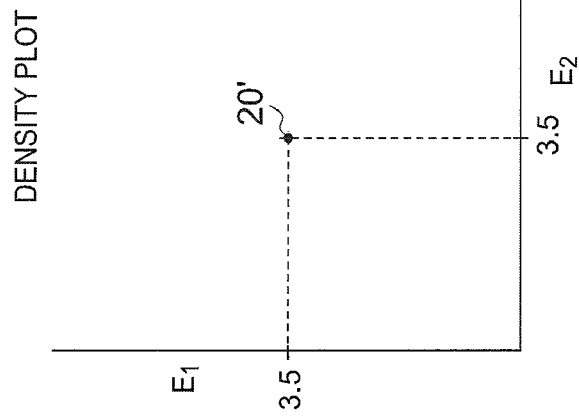
FIG. 4A illustrates an exemplary image space where each of the spatial data points represents a corresponding one of the pixels or the detector elements.
Figure 4B:
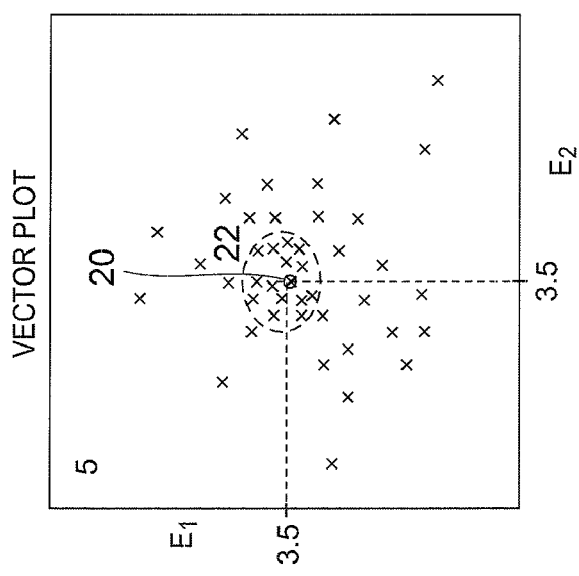
FIG. 4B illustrates a vector plot based upon partial pairs of the HU values.
Figure 4C:
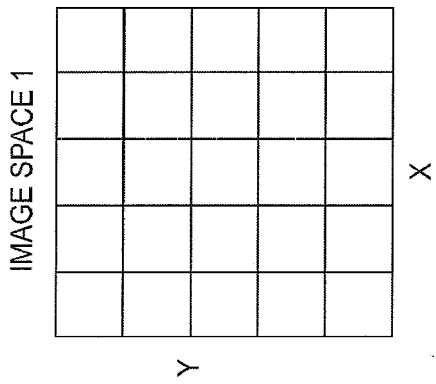
FIG. 4C illustrates a density plot that is generated from the vector plot of FIG. 4B for an improved material separation according to the current invention.

Now referring to FIGS. 4A, 4B and 4C, diagrams illustrate one embodiment of the material separation process based upon the dual energy data according to the current invention. FIG. 4A illustrates an exemplary image space 1 where each of the spatial data points represents a corresponding one of the pixels or the detector elements. The X and Y axes of the image space 1 as illustrated in FIG. 4A respectively correspond to the location of the pixels or the detector elements, and each square represents a pixel having a pair of the low and high HU values. For simplicity, only a part of the image space 1 is illustrated, and the data point values are not shown. Subsequently, the low and high HU values of the pixels are mapped into two dimensional histograms such as a vector plot and a density plot according to one embodiment of the current invention.

Now referring to FIG. 4B, the X and Y axes of a vector plot respectively correspond to the HU values of the low and high energy projection. In this example, numerous pixels in the image space 1 are mapped into the corresponding image data points in the vector plot of FIG. 4B as indicated by a plurality of "X." The image data points are also referred to as pixels. For example, an image data point 20 has a pair of the HU values E1 and E2 of (3.5, 3.5) in the vector plot. In general, the current invention requires that all pairs of the HU values E1 and E2 corresponding to an image area of interest are plotted in the vector plot. For simplicity, FIG. 4B shows that only partial pairs of the HU values are plotted in the vector plot.

As illustrated in one embodiment, a density plot of FIG. 4C is also called a density map and is generated from a vector plot of FIG. 4B for an improved material separation according to the current invention. In one embodiment, after data-domain dual energy decomposition, it is assumed in this example that all of the predetermined dual energy data in a give image space of interest are plotted as image data points X in a vector plot whose axes respectively correspond to a first HU value and a second HU value. For example, a given image data point 20 has a first HU value of 3.5 and a second HU value of 3.5 in the vector plot in FIG. 4B. Based upon a common rule, a region of interest (ROI) 22 is defined surrounding each of the image data points in the vector plot of FIG. 4B. Then, a number of image data points is counted within the ROI 22 as a density value. For example, a number of image data points X inside the ROI 22 is fifteen including the image data point 20. In general, the ROI 22 does not represent a predetermined material and is commonly defined in a proximity of a given data point in the vector plot. One exemplary ROI is an elliptical region having a center at the image data point 20. The size of the ROI 22 is optionally determined by the noise standard deviation in the underlying image with high and low X-ray energy.

Still referring to FIGS. 4B and 4C, the density plot is generated based upon the above counted density values that respectively represent a density level of the surrounding image data points in the ROI 22 of the vector plot. The density level 20' in FIG. 4C in relation to the image data point 20 in FIG. 4B is now represented by a certain visual cue such as a color. The color coded density level 20' is plotted at the corresponding first HU value of 3.5 and the corresponding second HU value of 3.5 in the density plot in FIG. 4C. Based upon the above example, the number of image data points inside the ROI 22 is fifteen including the image data point 20, and a predetermined corresponding color such as blue is used to represent this density level according to one embodiment. For each image data point in the vector plot, the above described density level is repeatedly determined by counting a number of the image data points inside the corresponding region of interest. According to one technique of the current invention, the image data points are repeatedly examined one at a time towards the periphery of a suspected cluster, and some data points far outside of the suspected cluster may be included in the same cluster.

The above determined value of the image data points is represented by an assigned color that is associated with a determined density level to generate the density plot. The density level for a given image data point is thus determined based upon a density value or the number of the image data points inside the ROI in the vector plot of FIG. 4B and is represented by a certain color in the density plot at the corresponding data point location in FIG. 4C. In general, density plots act like an averaging filter so it is very stable to noise, and no additional low-pass filtering is necessary.

Accordingly, clustering of a certain material is visualized by a predetermined visualization scheme in one embodiment according to the current invention. That is, due to a selected visual cue, a certain common material appears as a cluster in the density plot according to the current invention without necessarily knowing the density distribution pattern of the material in advance. One exemplary visualization scheme includes color assignments such as a gray scale and an array of predetermined colors. The intensity levels or colors are optionally indicated by gradation of 0 through 255 or 0 through 1080. In case of intensity representation, the higher the intensity indicator is expressed, the higher the density level is.

One exemplary color assignment scheme is the RGB model if no more than three materials need to be identified. Each material is optionally assigned to a primary color, R, G, or B. For the pixels outside the clusters that are not necessarily determined to be a part of any of the identified materials, a color with the RGB components is optionally assigned based upon their distance to the respective material clusters or their probability to belong to each of the clusters.

Another exemplary color assignment scheme is the HSL model, which provides more flexibility and is useful if more than three materials need to be represented. A specific value of Hue is assigned to each material cluster. As described above with respect to the RGB model, a specific Hue value of the undecided pixels is computed based on their likelihood to belong to each of the clusters. Since Hue varies in the angular direction and stays constant in the radial direction in the HSL model, saturation represents the data "fidelity" and is set to be 1 for all pixels within material clusters and along the lines connecting the clusters. For other pixels, saturation reduces as pixels get farther away from the clusters. Thus, effects of data inconsistency such as caused by misregistration between high/low energy data sets are mitigated. Luminance can be used to bring another dimension to the material separation map by indicating density variation of the same material. Alternatively, Luminance differentiates materials with a similar Z-number but at a different density. A good example of the use of Luminance is to differentiate lean muscle from fat tissue in material separation. Note that Luminance varies in the radial direction and stays constant in the angular direction. The above described density visualization schemes are illustrative only, and the current invention is not necessarily limited by these visualization schemes.

Furthermore, clustering of material is optionally enhanced by comparing the density values to a predetermined threshold value. For example, the number of image data points inside the region of interest (ROI) 22 of FIG. 4B is fifteen including the image data point 20, and this density value is compared to a predetermined threshold value of twelve. Since the density value is above the predetermined threshold value, the visualization is permitted in this exemplary density plot. On the other hand, if the density value fails to exceed the predetermined threshold value, the visualization is not permitted and the density value is not plotted in the density plot. In another embodiment, the density values are optionally weighted by a predetermined weight value before the threshold comparison.

Figure 5A:
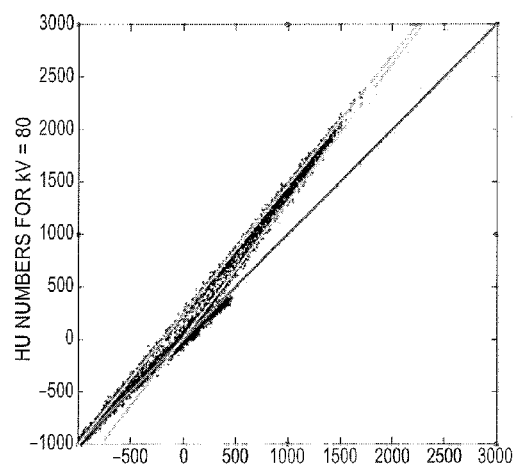
FIGS. 5A and 5B respectively illustrate a vector plot using polychromatic images and monochromatic images.
Figure 5B:
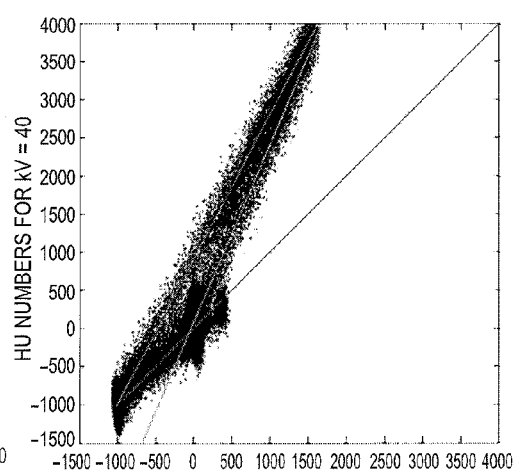

To further illustrate the above described embodiment of the advanced material separation using the dual energy data, FIGS. 5A and 5B respectively show vector plots using polychromatic images and monochromatic images. In both vector plots, image data points that correspond to a specific common material tend to cluster together. Alternatively, image data points that correspond to a mixture of two materials cluster along a boundary line. In other words, the mixtures often happen at the boundary between the two materials, and the exemplary boundary includes "Air-Tissue," "Air-Bone" and "Tissue-Bone" lines. FIGS. 5A and 5B also show a comparison of the vector plots constructed using polychromatic images and monochromatic images. The HU values of "low" energy polychromatic image are plotted against the HU values of "high" energy polychromatic image in FIG. 5A. Similarly, the HU values of "low" energy monochromatic image are plotted against the HU values of "high" energy monochromatic image in FIG. 5B. Since the vector plot in FIG. 5B tends to have wider regions of data point distributions along both axes than that in FIG. 5A, the monochromatic images provide better separation between materials than the polychromatic images in this example. On the other hand, the current invention is not limited by the use of the monochromatic images.

Figures 6A, 6B, 6C:
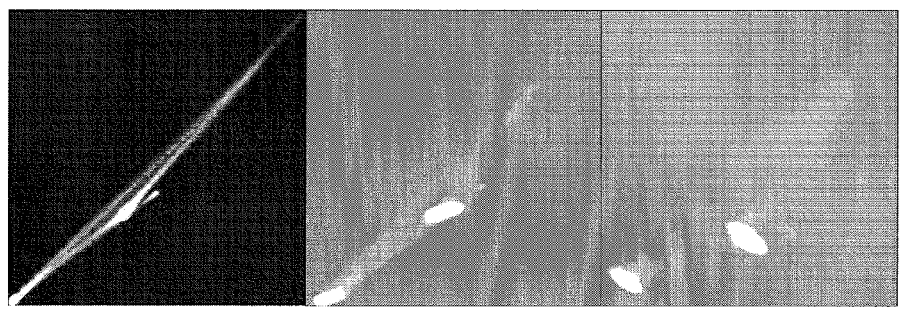
FIG. 6A illustrates a density plot based upon polychromatic images from the dual energy data obtained at the tube voltage at 80 keV and 135 keV.
FIG. 6B illustrates a density plot based upon monochromatic images at 70 keV and 135 keV.
FIG. 6C illustrates a density plot based upon monochromatic images at 40 keV and 135 keV.
Figures 7A, 7B, 7C:
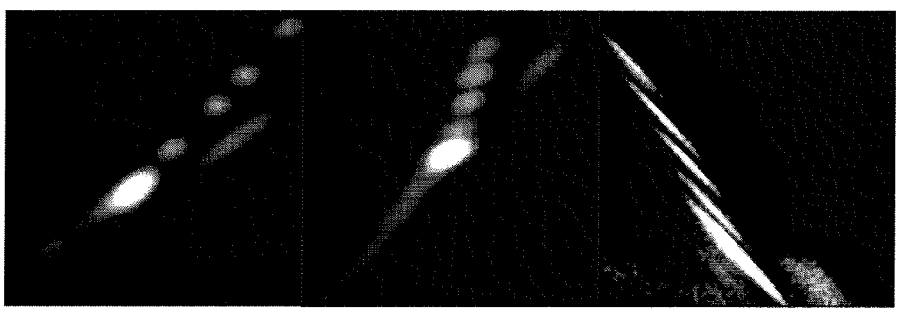
FIG. 7A illustrates a density plot based upon polychromatic image data from the dual energy data obtained at the tube voltage at 80 keV and 100 keV.
FIG. 7B illustrates a density plot based upon monochromatic image data at 70 keV and 100 keV.
FIG. 7C illustrates a density plot based upon two component images of bone and water.

Now FIGS. 6A, 6B and 7C respectively illustrate density plots based upon dual energy data at three pairs of energy spectra according to one embodiment of the current invention. As already described, to construct a density plot, the number of pixels or image data points within an elliptical ROI is computed for each pixel in the vector plot. For example, the elliptical ROI has semi-axes a and b that are proportional to the noise standard deviation in the underlying monochromatic images. In general, the density plots of FIGS. 6A, 6B and 6C show a good separation of clusters that represent different materials. FIG. 6A illustrates a density plot based upon polychromatic images from the dual energy data obtained at the tube voltage at 80 keV and 135 keV. FIG. 6B illustrates a density plot based upon monochromatic images at 70 keV and 135 keV. Lastly, FIG. 6C illustrates a density plot based upon monochromatic images at 40 keV and 135 keV. In generating the dual energy data, since the tube kV setting corresponds only to the peak photon energy and the mean energy of the x-ray photon spectra is much lower than the peak energy, the differentiation between "high" and "low" energies is generally small in the polychromatic images.

Now FIGS. 7A, 7B and 7C respectively illustrate density plots based upon the dual energy data at certain energy spectra and two component images. As already described, to construct a density plot, the number of pixels or image data points within an elliptical ROI is computed for each pixel in the vector plot. FIG. 7A illustrates a density plot based upon polychromatic image data from the dual energy data obtained at the tube voltage at 80 keV and 100 keV. FIG. 7B illustrates a density plot based upon monochromatic image data at 70 keV and 100 keV. Lastly, FIG. 7C illustrates a density plot based upon two component images of bone and water. Note that in addition to two monochromatic images and two polychromatic images, the density plots according to the current invention are optionally generated based upon any dual energy pair including basis component images such as a pair of water and bone and a pair of Z-number and density images.

In addition, certain clustering special image processing methods are used to determine the boundaries of each cluster for improving the accuracy of material separation. One exemplary technique involves region growing and Gaussian decomposition in order to determine the boundaries of each cluster. The following filtering operation implements the region growing and involves three general steps. Given a cluster S in the density plot, which is initially obtained by thresholding and a pixel $(i_0, j_0)$ outside the cluster S, a first step is to take a sub-matrix A of size $(K_i, K_j)$ around the pixel ($i_0$, $j_0$). A second step is to assign w(i, j)=1 if the pixel (i, j) belongs to S, else w(i, j)=−1 for each pixel (i, j) in A set. Lastly, a third step is to compute a predetermined function, $$f(i_0, j_0) = \sum_{(i,j) \in A} w(i, j) A(i, j).$$

As a result of the last computation, if the value of f($i_0$, $j_0$) is larger than 0, the pixel ($i_0$, $j_0$) will be added to the cluster S. On the other hand, if the value of f($i_0$, $j_0$) is not larger than 0, the pixel ($i_0$, $j_0$) will not be added to the cluster S.

The above described region-growing may not perform correctly when clusters overlap. In this regard, when several clusters overlap, Gaussian decomposition is used in the following manner. In the use of Gaussian decomposition, it is assumed that image noise has Gaussian distribution so that each cluster in the density plot is represented by a 2D Gaussian function. In general, a 2D Gaussian function varies in two separate widths and rotation. The initial estimate of the center of each Gaussian is the center of the cluster. The variance (width parameters) of the Gaussian can be measured directly from image noise standard deviation, and noise in the two monochromatic images is correlated because they are both derived from the same polychromatic pair of images. In this regard, the only free parameter that needs to be estimated is the rotation angle $\partial$ of a 2D normal distribution of random variables $\tilde{H}_1$, $\tilde{H}_2$, which can be related to the covariance and variances of $\tilde{H}_1$, $\tilde{H}_2$ as follows:

$$\tan 2\partial = \frac{2 CoVar\{\tilde{H}_1, \tilde{H}_2\}}{Var\{\tilde{H}_2\} - Var\{\tilde{H}_1\}},$$

where $$CoVar\{\tilde{H}_1, \tilde{H}_2\} = \frac{1}{N} \sum_i [(H_1(i) - \overline{H}_1)(H_2(i) - \overline{H}_2)],$$

$$Var\{\tilde{H}_k\} = \frac{1}{N} \sum_i (H_k(i) - \overline{H}_k)^2,$$

$$\overline{H}_k = \frac{1}{N} \sum_i H_k(i).$$

Figure 8:
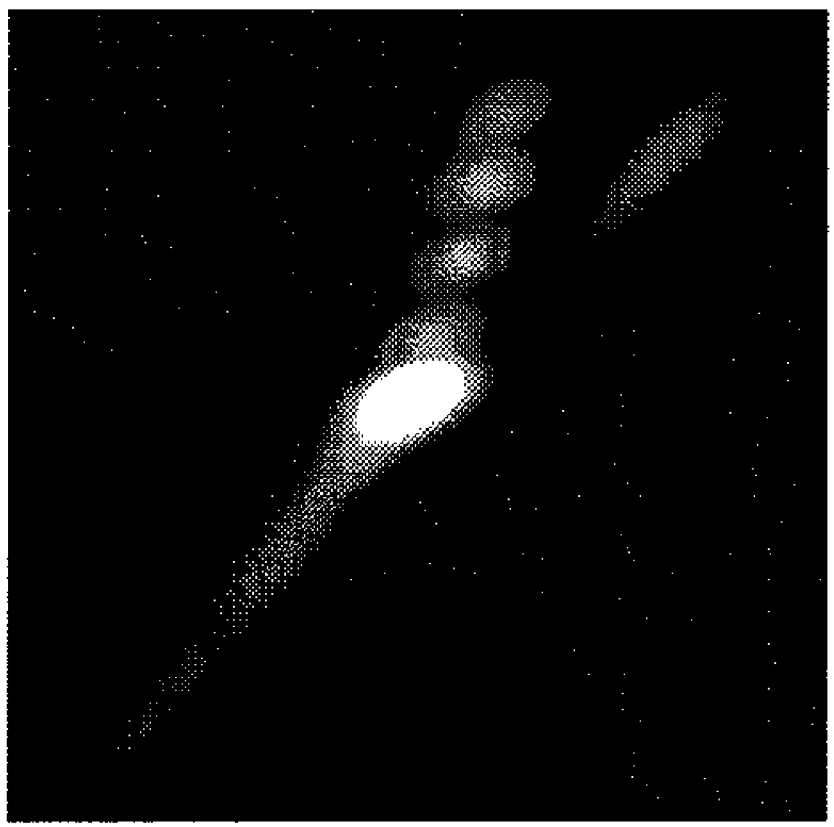
FIG. 8 illustrates an example of 2D Gaussian rotation in the density plot.

Although several iterations may be required to optimize Gaussian parameters for all pixels, it should be sufficiently fast since only several global parameters are being optimized. FIG. 8 illustrates an example of 2D Gaussian rotation in the density plot. The Gaussian decomposition approach is adaptive to image noise because it takes into account the image noise standard deviation.

Data-based dual energy decomposition allows direct reconstruction of two basis materials such as bone and soft tissue. Furthermore, using data-based decomposition, monochromatic images are obtained at any desired keV. According to one embodiment of the current invention, the monochromatic images are used to form a vector plot and to ultimately obtain a corresponding material separation map. The disclosed separation method is not limited to a particular number of materials to be separated and is suitable for separating three or more materials.

Figure 9:
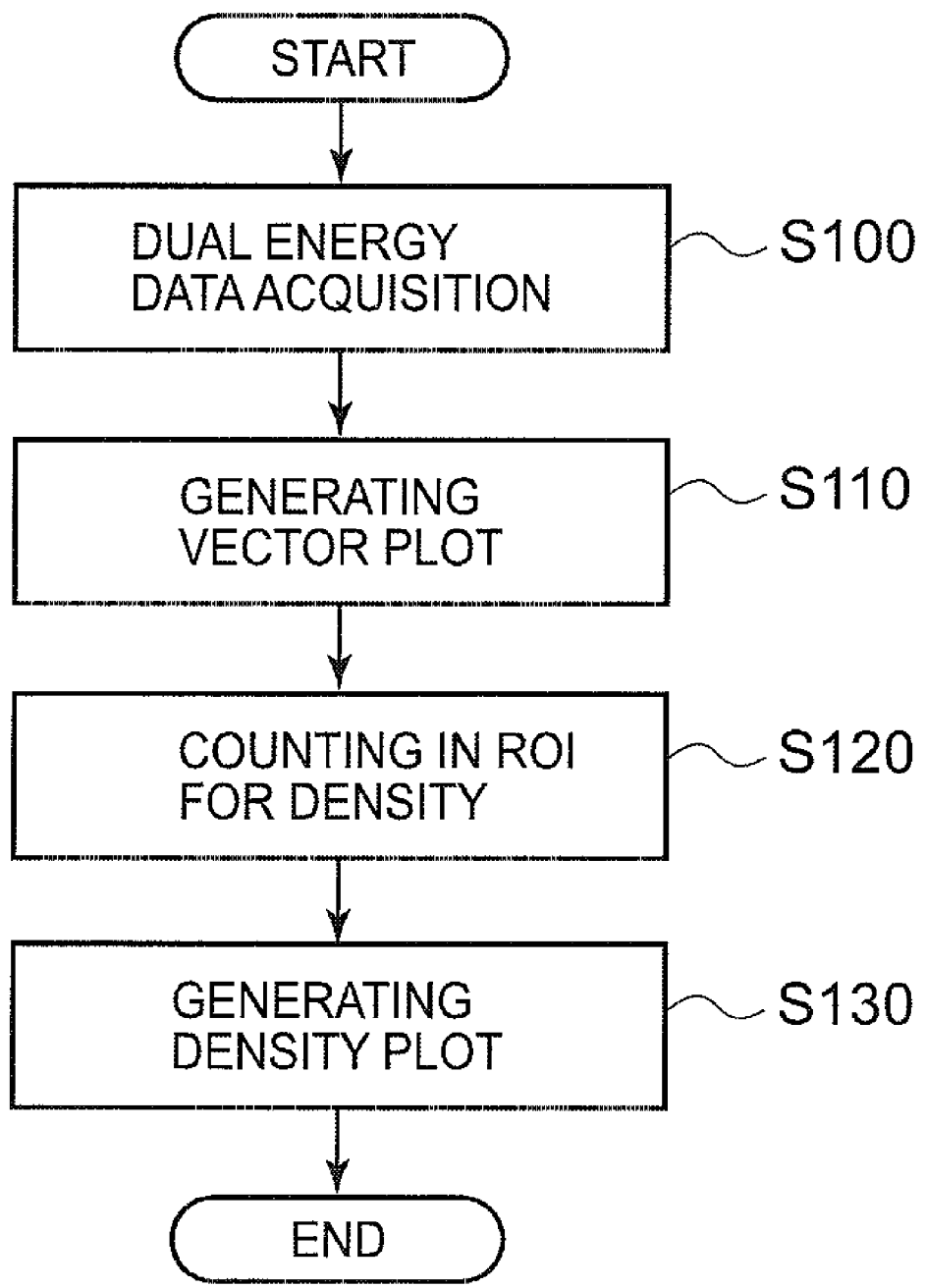
FIG. 9 is a flow chart illustrating steps of one exemplary process of the advanced material separation according to the current invention.

Now referring to FIG. 9, a flow chart illustrates steps of one exemplary process of the advanced material separation according to the current invention. In a step S100, dual energy data is acquired by a predetermined dual energy data acquisition method. As introduced in the prior art technology, a predetermined dual energy data acquisition method includes a variety of techniques such as fast kV-switching, slow kV-switching, a dual source CT-scanner and a sandwich detector. The step S100 utilizes any of these or other dual energy data acquisition techniques. After the step S100, assuming a polychromatic X-ray source, the acquired dual energy data is polychromatic in nature and optionally undergoes data domain decomposition to generate monochromatic images via monochromatic data equivalent. Alternatively, the acquired polychromatic dual energy data may be used as polychromatic images without undergoing data domain decomposition. Furthermore, the data domain decomposition optionally generates the two basis images including a pair of Z-number and density images and a pair of Compton and photoelectric effect images, and these two basis images are also optionally used in the following steps according to the current invention.

Based upon the above described images, a vector plot is constructed in a step S110. As described above with respect to FIG. 4B, the vector plot is a 2D histogram, and image data points are plotted from the two basis image data such as monochromatic images after data domain decomposition. In one exemplary vector plot, the X and Y axes respectively correspond to the HU values of the low and high HU values corresponding to each pixel or detector element. To construct a vector plot, the image data may be either monochromatic or polychromatic or other two basis images.

After a vector plot in the step S110, a density level is determined for each of the image data points in the vector plot in a step S120. For each image data point, a region of interest is determined with respect to the given image data point. As described before, a region of interest is optionally an eclipse whose size is according to noise variance. For each image data point, a number of image data points is counted within the corresponding region of interest in the step S120. The above counted number of the inside image data points is a density value to define a density level of a given image data point. Until every image data point in the vector plot undergoes the above described operation, the step S120 is repeated. According to one technique of the current invention, one image data point is repeatedly examined at a time towards the periphery of a suspected cluster, and the data points far outside of the suspected cluster are also examined.

Lastly, a density plot is generated in a step S130 based upon the above computed density values in each of the region of interest. A data point in the density plot indicates the density level and is optionally visualized by an assigned cue based upon a corresponding density value in the step S130. The visualization cue includes a predetermined array of colors and gray scale. Although the visualization scheme alone may render sufficient clustering of certain materials, the exemplary process optionally includes an additional step of applying a predetermined threshold to each of the above density values before plotting the corresponding data point in the density plot. Furthermore, the separation of the clusters is optionally enhanced by certain region growing techniques such as the use of a 2D Gaussian function.

In addition, a material separation map is formed based upon the above discussed separated clusters in the density plot. Each cluster usually represents a clinically significant material such as bone, and each material is visualized by a distinct cue such as an assigned color in a reconstructed image. For those image data points that do not clearly belong to a particular cluster, the exemplary process according to the current invention assigns certain other colors or visual cues to indicate their material status.

In the above described exemplary process, although the separate steps are illustrated in a sequential manner, the current invention is not necessarily limited by the above illustrated steps and sequence. For example, even though the flow chart in FIG. 9 illustrates sequentially separate steps S120 and S130, the current invention may be implemented to perform the tasks in these two steps substantially at the same time.

Figures 10A, 10B, 10C:
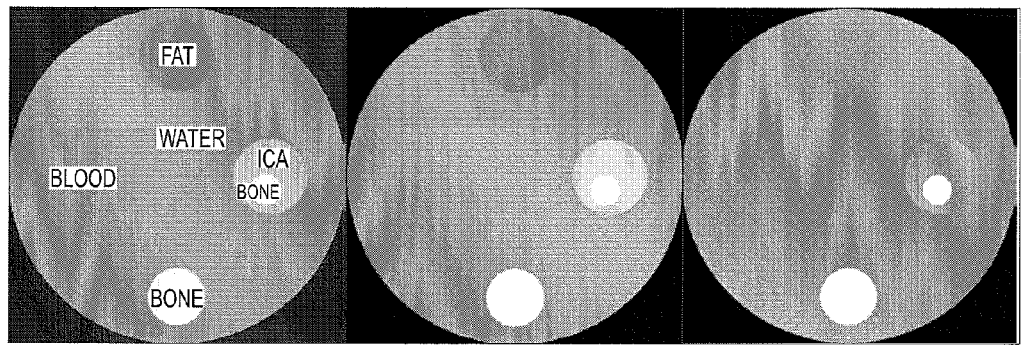
Figures 11A, 11B, 11C:
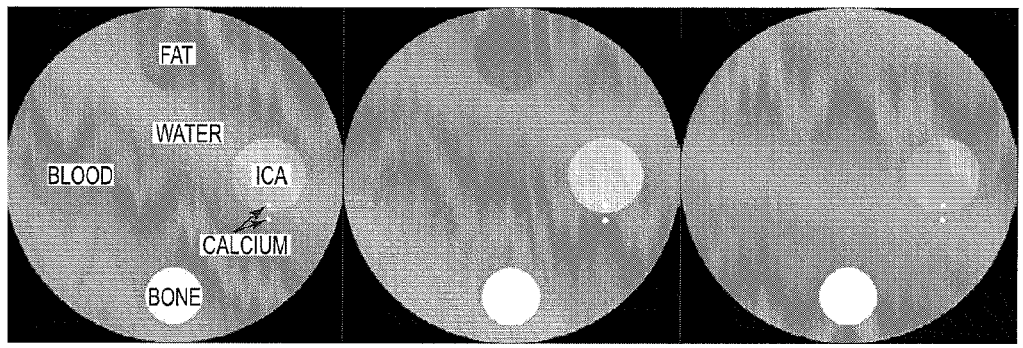

Now referring to FIGS. 10 and 11, using a polychromatic simulation data, monochromatic images are obtained according to data-domain dual energy decomposition. FIG. 10A illustrates a phantom definition including fat, blood, bone, water and iodine contrast agent (ICA) for the simulation data. FIG. 10B illustrates monochromatic image at 40 keV while FIG. 10C illustrates monochromatic image at 100 keV. Similarly, FIG. 11A illustrates a phantom definition including fat, blood, bone, water, calcium and iodine contrast agent (ICA) for the simulation data. FIG. 11B illustrates monochromatic image at 70 keV while FIG. 11C illustrates monochromatic image at 100 keV.

Figure 12A:
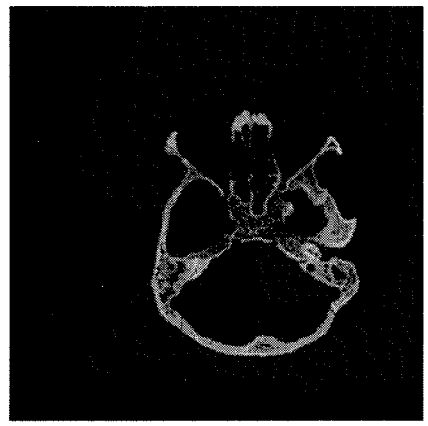
FIG. 12A illustrates bone component of data-domain dual energy decomposition of the head phantom.
Figure 12B:
FIG. 12B illustrates soft tissue component of data-domain dual energy decomposition of the head phantom.
Figure 12C:
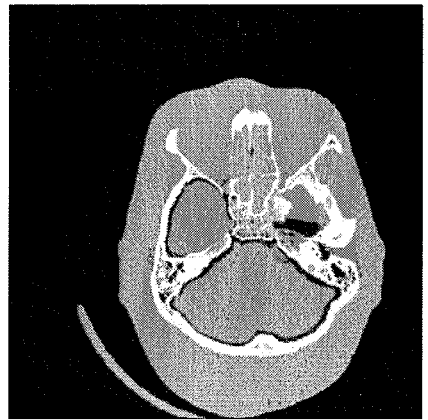
FIGS. 12C and 12D respectively illustrate a monochromatic image at 40 keV and 135 keV.
Figure 12D:
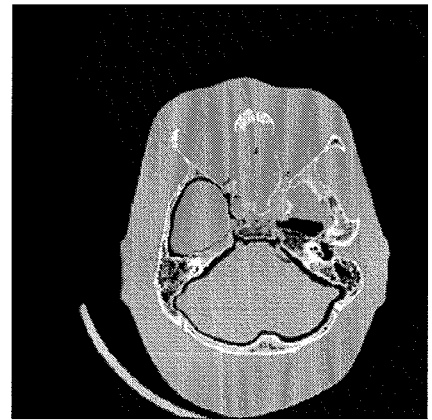
Figure 13A:
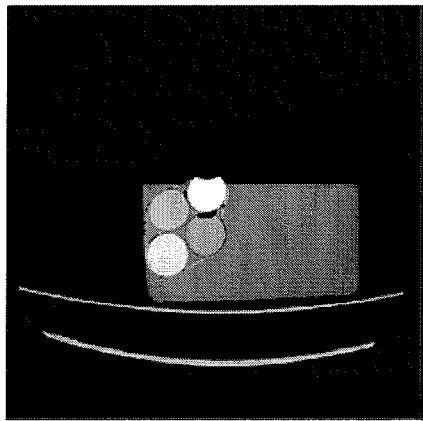
FIGS. 13A and 13B respectively illustrate a polychromatic image at 80 keV. and 135 keV.
Figure 13B:
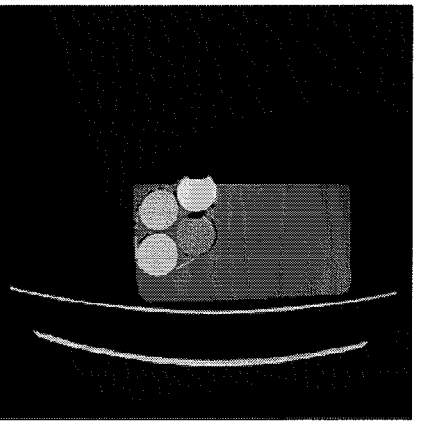
Figures 14A, 14B, 14C:
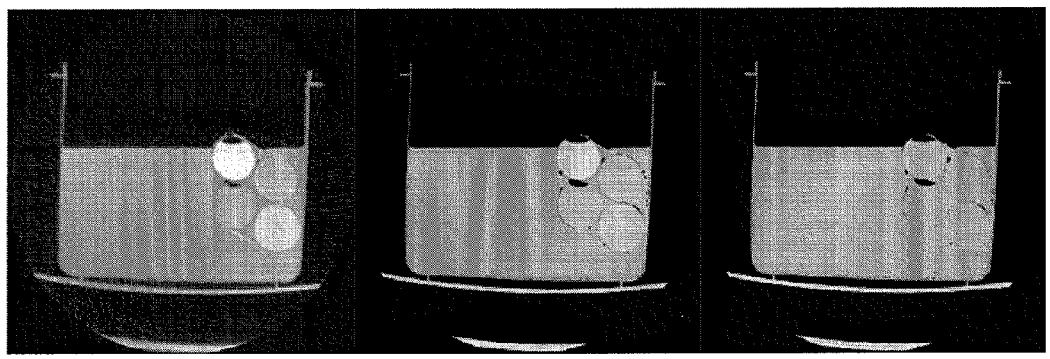
FIGS. 14A, 14B and 14C respectively illustrate a monochromatic image at 40 keV, 70 keV and 100 keV.

To test the bone removal application, real dual energy data of the head phantom is utilized. As shown in FIGS. 12A through 12D, data-domain dual energy decomposition of the head phantom is shown. FIG. 12A shows bone component of data-domain dual energy decomposition of the head phantom. FIG. 12B shows soft tissue component of data-domain dual energy decomposition of the head phantom. FIGS. 12C and 12D respectively illustrate monochromatic image at 40 keV and 135 keV. In addition, a phantom with varying iodine contrast agent (ICA) concentrations is used as shown in FIGS. 13A and 13B as well as 14A through 14C. Four ICA inserts are submerged in a water bath and have varying ICA concentrations by adding 25%, 50%, and 75% water. FIG. 13A illustrates polychromatic image at 80 keV while FIG. 13B illustrates polychromatic image at 135 keV. For data-domain dual energy decomposition of the ICA phantom, FIGS. 14A, 14B and 14C respectively illustrate monochromatic image at 40 keV, 70 keV and 100 keV.

FIGS. 15 through 17 illustrate results with simulated data, showing that Iodine contrast agent (ICA), bone, fat, blood, water, and small calcium inserts are separated in a substantially accurate manner. FIG. 15 illustrates monochromatic image at 40 keV for the simulated data as shown in FIG. 10. Although monochromatic image at 40 keV in FIG. 15 reveals an artifact that is caused by the iodine K-edge (33 keV), this artifact does not affect the material separation. FIG. 16A illustrates results in a density map for the simulated data as shown in FIG. 10. FIG. 16B illustrates a color assignment, which is applied to the density map of FIG. 16A to generate a material separation map of FIG. 16C. FIG. 17 illustrates a material separation map for the simulated data as shown in FIG. 11.

Figures 18A, 18B:
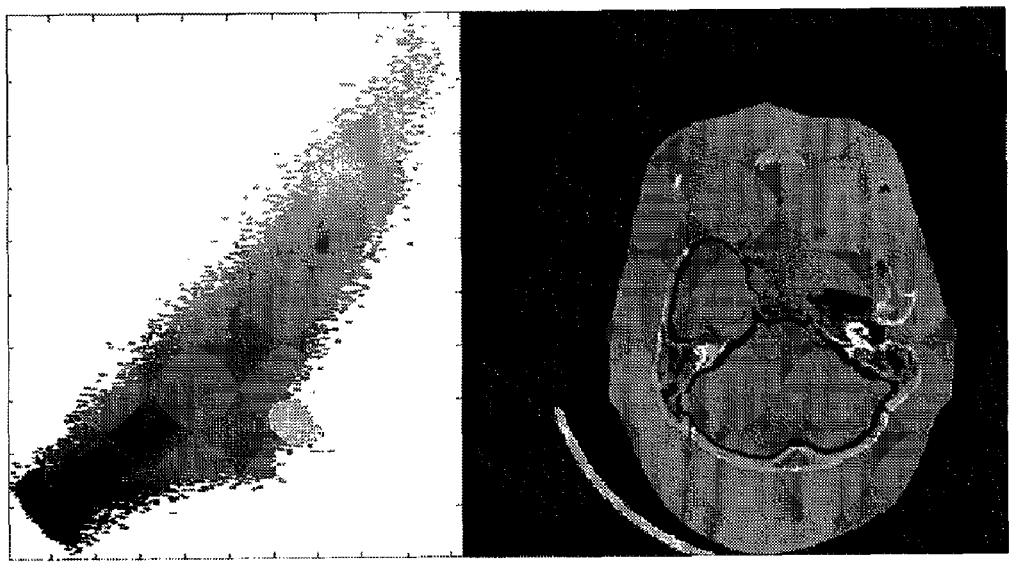
FIGS. 18A and 18B respectively illustrate a color-coded density plot and a material separation map for the real dual energy data of the head phantom as shown in FIG. 12.

Now referring to FIGS. 18A and 18B, a color-coded density map and a material separation map are illustrated for the real dual energy data of the head phantom as shown in FIG. 12. Bone and soft tissue are separated in a substantially accurately manner.

Figures 19A, 19B, 19C:
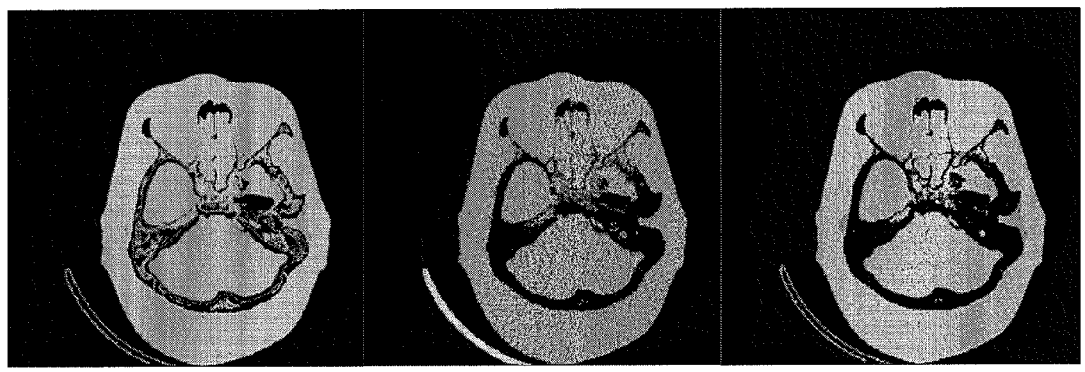
FIG. 19A illustrates a material separation map after bone removal using a prior art threshold technique.
FIG. 19B illustrates a soft tissue component of the direct data-domain dual energy decomposition.
FIG. 19C illustrates bone removal based upon an exemplary process according to the current invention.

Furthermore, an embodiment of the separation process is attempted in the bone removal application using anthropomorphic phantom head data as shown in FIG. 12. Results of the bone removal are shown in FIGS. 19A through 19C. FIG. 19A illustrates a material separation map after bone removal using a prior art threshold technique. FIG. 19B illustrates soft tissue component of direct data-domain dual energy decomposition. FIG. 19C illustrates bone removal based upon an exemplary process according to the current invention. The material separation map results in a more accurate bone removal in comparison to a prior art threshold technique.

Figures 20A, 20B, 20C:
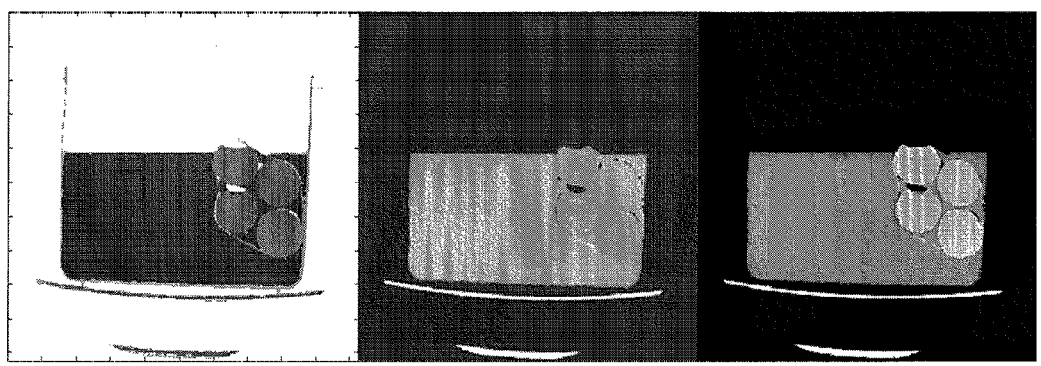
FIGS. 20A, 20B and 20C respectively illustrate results of virtual contrast removal using ICA phantom data as shown in FIGS. 13 and 14.
Figure 21:
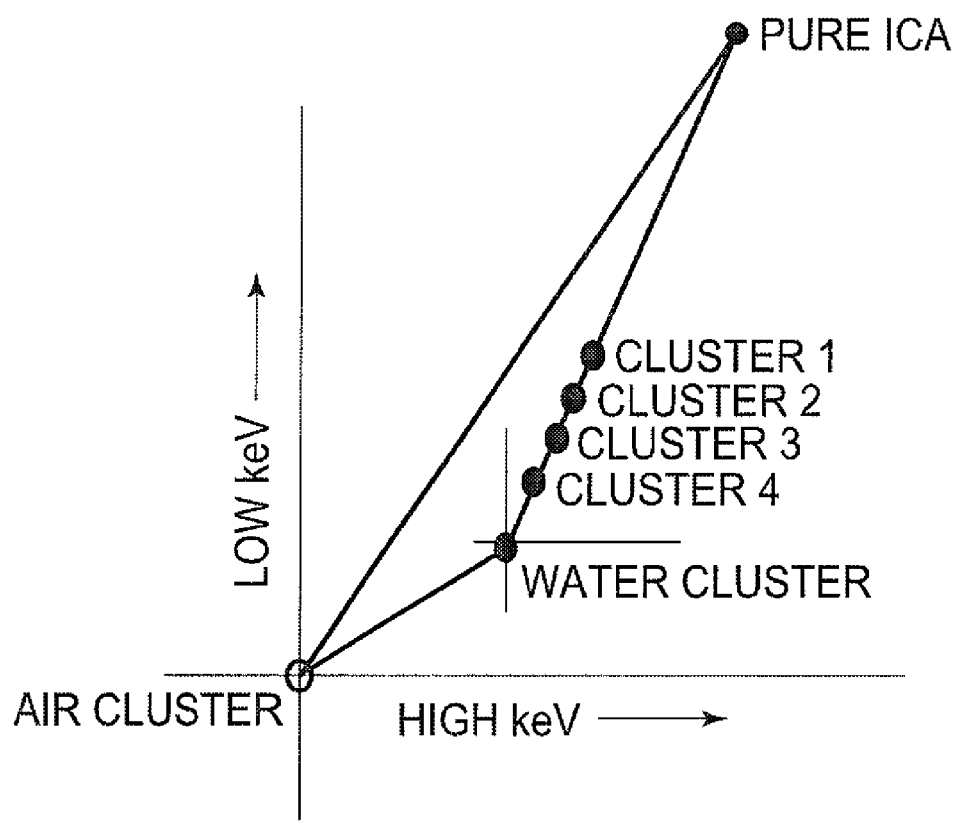
FIG. 21 illustrates a vector arithmetic that is used to estimate an ICA concentration in each cluster.

FIGS. 20A, 20B and 20C illustrate results of virtual contrast removal using ICA phantom data as shown in FIGS. 13 and 14. FIG. 20A illustrates a material separation map. FIG. 20B illustrates a virtual non-contrast (VNC) image. FIG. 20C illustrates a virtual non-contrast (VNC) image with contrast overlay. For better separation, it appears useful to use two pairs 40/70 keV and 70/100 keV of both low-HU and high-HU clusters. Given a pixel, each pair provides some probability for this pixel to belong to a certain cluster based on the distance to that cluster. ICA concentration can be estimated in each cluster, provided that HU numbers of the pure ICA are known, using the vector arithmetic as shown in FIG. 21.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of material separation in dual energy computed tomography (CT), comprising the steps of:
    a) acquiring dual energy data for image data as a subject portion is being scanned;
    b) plotting image data points in a vector plot based upon the dual energy data, the vector plot having HU values in both axes;
    c) defining in the vector plot a region of interest according to a common rule for a given one of the image data points;
    d) counting a number of the image data points inside the region of interest in the vector plot to define a density value for the given one of the image data points;
    e) repeating said steps c) and d) for each of the image data points in the vector plot; and
    f) plotting a density plot based upon the density values, the density plot having HU values in both axes.

2. The method of material separation according to claim 1 wherein said step a) is accomplished by dual energy data acquisition techniques including fast kV-switching, slow kV-switching, dual sources and a sandwich detector.

3. The method of material separation according to claim 1 wherein the density values in the density plot are visualized by a predetermined scheme.

4. The method of material separation according to claim 3 wherein the scheme includes a color coding scheme.

5. The method of material separation according to claim 1 wherein the dual energy data undergoes data-domain decomposition to generate monochromatic images before the image data points are plotted in said step b).

6. The method of material separation according to claim 1 wherein the dual energy data include polychromatic images.

7. The method of material separation according to claim 1 further comprising an additional step of applying the density plot to the image data to generate a material separation map.

8. The method of material separation according to claim 7 further comprising an additional step of displaying the material separation map.

9. The method of material separation according to claim 1 further comprising an additional step of comparing the density values to a predetermined threshold value in said step f).

10. The method of material separation according to claim 1 further comprising an additional step of identifying clusters for separating materials.

11. The method of material separation according to claim 10 further comprising an additional step of region growing to establish boundaries of each of the clusters.

12. The method of material separation according to claim 10 further comprising an additional step of applying a Gaussian function if the clusters overlap.

13. The method of material separation according to claim 12 wherein the Gaussian function is a 2D Gaussian.

14. A method of material separation in dual energy computed tomography (CT), comprising:
   a) acquiring dual energy data for image data as a subject portion is being scanned;
   b) performing data-domain decomposition on the dual energy data to generate two basis images having two basis image values;
   c) plotting image data points in a vector plot based upon the two basis image values;
   d) defining in the vector plot a region of interest according to a common rule for a given one of the image data points;
   e) counting a number of the image data points inside the region of interest in the vector plot to define a density value for the given one of the image data points;
   f) repeating said steps d) and e) for each of the image data points in the vector plot;
   g) plotting a density plot indicating the density values for each of the image data points; and
   h) separating clusters in the density map to generate separated clusters based upon the density values.

15. The method of material separation according to claim 14 wherein the two basis images include monochromatic images, Z-number and density images, and Compton and photoelectric effect images.

16. The method of material separation according to claim 14 further comprising an additional step of applying the separated clusters to the image data to generate a material separation map.

17. The method of material separation according to claim 14 wherein said step h) is initially accomplished by comparing the density values to a predetermined threshold value.

18. The method of material separation according to claim 17 wherein said step h) is further accomplished by a region growing technique.

19. The method of material separation according to claim 18 wherein the region growing technique includes a 2D Gaussian function.

20. A dual energy computed tomography (CT) system configured to perform material separation on dual energy data, comprising:
   a dual energy data acquisition device for acquiring dual energy data for image data as a subject portion is being scanned; and
   a reconstruction device connected to said dual energy data acquisition device for processing image data points in a vector plot based upon the dual energy data, the vector plot having HU values in both axes, said reconstruction device defining in the vector plot a region of interest according to a common rule for each of the image data points, wherein said reconstruction device counts a number of the image data points inside the region of interest in the vector plot to define a density value for each of the image data points in the vector plot, and said reconstruction device processes a density plot based upon the density values, the density plot having HU values in both axes.

21. The dual energy computed tomography (CT) system according to claim 20 wherein said dual energy data acquisition device performs a dual energy data acquisition technique including fast kV-switching, slow kV-switching, dual sources and a sandwich detector.

22. The dual energy computed tomography (CT) system according to claim 20 wherein said reconstruction device visualizes the density values in the density plot based upon a predetermined scheme.

23. The dual energy computed tomography (CT) system according to claim 22 wherein the scheme includes a color coding scheme.

24. The dual energy computed tomography (CT) system according to claim 20 wherein said reconstruction device performs data-domain decomposition on the dual energy data to generate monochromatic images before the image data points are processed.

25. The dual energy computed tomography (CT) system according to claim 20 wherein the dual energy data include polychromatic images.

26. The dual energy computed tomography (CT) system according to claim 20 wherein said reconstruction device applies the density plot to the image data to generate a material separation map.

27. The dual energy computed tomography (CT) system according to claim 26 further comprising a display unit connected to said reconstruction device for displaying the material separation map.

28. The dual energy computed tomography (CT) system according to claim 20 wherein said reconstruction device further compares the density values to a predetermined threshold value.

29. The dual energy computed tomography (CT) system according to claim 20 wherein said reconstruction device identifies clusters for separating materials.

30. The dual energy computed tomography (CT) system according to claim 29 wherein said reconstruction device further applies a region growing technique to establish boundaries of each of the clusters.

31. The dual energy computed tomography (CT) system according to claim 30 wherein said reconstruction device further relies on a Gaussian function if the clusters overlap.

32. The dual energy computed tomography (CT) system according to claim 20 wherein the Gaussian function is a 2D Gaussian.

33. A dual energy computed tomography (CT) system configured to perform material separation on dual energy data, comprising:
   a dual energy data acquisition device for acquiring dual energy data for image data as a subject portion is being scanned; and
   a material separation unit connected to said dual energy data acquisition for performing data-domain decomposition on the dual energy data to generate two basis images having two basis image values, said material separation unit processing image data points in a vector plot based upon the two basis image values, said material separation unit also defining in the vector plot a region of interest according to a common rule for a given one of the image data points, wherein said material separation unit counts a number of the image data points inside the region of interest in the vector plot to define a density value for each of the image data points in the vector plot, said material separation unit processes a density plot based upon the density values, said material separation unit separates clusters in the density map to generate separated clusters based upon the density values.

34. The dual energy computed tomography (CT) system according to claim 33 wherein the two basis images include monochromatic images, Z-number and density images, and Compton and photoelectric effect images.

35. The dual energy computed tomography (CT) system according to claim 33 wherein said material separation unit applies the separated clusters to the image data to generate a material separation map.

36. The dual energy computed tomography (CT) system according to claim 33 wherein said material separation unit initially separates the clusters by comparing the density values to a predetermined threshold value.

37. The dual energy computed tomography (CT) system according to claim 36 wherein said material separation unit further separates the clusters by applying a region growing technique.

38. The dual energy computed tomography (CT) system according to claim 37 wherein the region growing technique includes a 2D Gaussian function.

* * * * *